United States Patent [19]

Ferrari

[11] Patent Number: 4,659,545
[45] Date of Patent: Apr. 21, 1987

[54] HYDRIDE BLISTER-RESISTANT ZIRCONIUM-BASED NUCLEAR FUEL ROD CLADDING

[75] Inventor: Harry M. Ferrari, Edgewood Boro, Pa.

[73] Assignee: Westinghouse Electric Corp., Pittsburgh, Pa.

[21] Appl. No.: 607,871

[22] Filed: May 7, 1984

[51] Int. Cl.⁴ .............................................. G21C 3/06
[52] U.S. Cl. .................................. 376/457; 376/414; 376/416; 376/417
[58] Field of Search ................ 376/414, 416, 417, 457

[56] References Cited

U.S. PATENT DOCUMENTS

| | | |
|---|---|---|
| 2,969,309 | 1/1961 | Finniston et al. |
| 3,069,338 | 12/1962 | Schaner et al. |
| 3,291,700 | 12/1966 | Brossa et al. |
| 3,625,821 | 12/1971 | Ricks |
| 4,022,662 | 5/1977 | Gordon et al. |
| 4,029,545 | 6/1977 | Gordon et al. |
| 4,045,288 | 8/1977 | Armijo ................................ 376/414 |
| 4,093,756 | 6/1978 | Donaghy |
| 4,137,131 | 1/1979 | Donaghy |
| 4,279,700 | 7/1981 | Boyle et al. |
| 4,284,660 | 8/1981 | Donaghy et al. |
| 4,362,696 | 12/1982 | Brehm, Jr. et al. |
| 4,372,817 | 2/1983 | Armijo et al. |
| 4,390,497 | 6/1983 | Rosenbaum ........................ 376/414 |

Primary Examiner—Donald P. Walsh
Attorney, Agent, or Firm—R. D. Fuerle

[57] ABSTRACT

A hydride blister-resistant nuclear fuel rod cladding has a tubular cladding formed from a zirconium-based alloy which has a thin nickel base film, of a thickness of about 0.01 to 5 microns distributed over between 1–40 percent of the area of the internal surface of the tubular cladding. The dispersed nickel base film provides multiple sites for hydride transport from the interior of the nuclear fuel rod and prevents localized hydride transport and resulting hydride blistering.

17 Claims, 3 Drawing Figures

HYDRIDE BLISTER-RESISTANT ZIRCONIUM-BASED NUCLEAR FUEL ROD CLADDING

BACKGROUND OF THE INVENTION

1. Field of the Invention

The present invention relates to an improved metallic tubular cladding for nuclear fuel rods, which will prevent formation of hydride blisters on the cladding and possible resultant failure of the cladding.

2. Description of the Prior Art

In the production of electrical energy from nuclear reactor systems, the reactor provides heat for steam production and subsequent production of electricity. In the nuclear reactor, nuclear fuel rods are present which contain a nuclear fuel such as pellets of uranium dioxide or a mixture of uranium and plutonium dioxides. These fuel rods are metallic tubular shells, or cladding, which contain the fuel pellets and which must maintain their integrity so as to prevent any leakage into or out of the shell. Some of the conventional light water reactor (LWR) fuel rod designs and support structures are described in J. T. A. Roberts, "Structural Materials in Nuclear Power Systems," Plenum Press, New York, (1981), at pp. 53–61. This document is hereby incorporated by reference.

The conventional cladding type, at present, is a cladding of a zirconium-based alloy, such as, Zircaloy-2, Zircaloy-4, and zirconium-2.5 weight percent niobium alloy. Other types of cladding have been proposed. These proposals have included cladding of a zirconium base material with various coatings or barrier means provided on the inside wall to protect the cladding from attack by constituents released from the nuclear fuel during operation of a reactor containing the fuel rod. As examples of such coatings or barrier means that cover the full surface of the cladding, U.S. Pat. No. 4,022,662 described a cladding in connection with a separate unattached metal liner comprised of stainless steel, copper, copper alloys, nickel or nickel alloys, the liner disposed between the cladding and the fuel material. A diffusion barrier of chromium or chromium alloy is also disposed between the cladding and the metal liner. In U.S. Pat. No. 4,045,288, a composite fuel element cladding is described which comprises a zirconium alloy substrate having a metal barrier of 1–4 percent of the wall thickness formed from niobium, aluminum, copper, nickel, stainless steel and iron, and an inner layer of stainless steel, zirconium or a zirconium alloy metallurgically bonded on the inner surface of the metal barrier. U.S. Pat. No. 4,093,756 and U.S. Pat. No. 4,137,131 disclose processes for electroless deposition of a metal film, such as nickel, on a zirconium or zirconium alloy article, and refer to an earlier copending application, Ser. No. 522,769 filed November 11, 1974, which was abandoned in favor of a continuation application Ser. No. 725,824 filed Sept. 23, 1976. That earlier application related to a composite cladding comprising a zirconium-based outer layer and on the inside surface, a layer of copper, nickel, iron or iron alloys.

These, and other patents, have discussed the problems associated with cladding materials and have proposed means for overcoming such problems.

One particular problem that is present in cladding for nuclear fuel rods is the formation of hydride blisters on the cladding inner surface which can lead to eventual fracture or puncturing of the cladding. As discussed in U.S. Pat. No. 4,022,662, referred to above, hydrogen gas can be formed by slow reaction between the cladding, and residual water or other hydrogenous impurities in the sealed rod. Under certain conditions, localized hydriding of the interior surface of the cladding can form a single massive hydride blister which can result in failure of the cladding. Localized hydride blisters form when the zirconium oxide film, which may be intentionally or unintentionally formed on the inner surface of the cladding, becomes scratched or otherwise defective at a very small number of areas (usually one) which acts as a localized hydride sink.

Efforts to prevent hydride blistering have included vacuum outgassing of the fuel rod to remove hydride formatives, which is an expensive and difficult procedure; the use of getters at the top portion of the fuel rod, as described for example in U.S. Pat. No. 4,279,700 assigned to the assignee of the present invention; or extensive drying of the fuel pellets and dry storage thereof to remove all moisture, another expensive and difficult procedure.

An object of the present invention is to provide an economical and efficient fuel rod cladding that is resistant to formation of hydride blisters.

SUMMARY OF THE INVENTION

A zirconium-based nuclear fuel rod cladding is made resistant to localized hydride transport by the provision of a thin film of nickel metal, or nickel base-zirconium alloys, over between about 1–40 percent of the area of the internal surface of the cladding. The fuel rod contains fuel pellets therein, and may also contain a burnable poison. This thin film is uniformly distributed over the interior surface of the cladding and is between about 0.01 to 5 microns in thickness. The thin film provides multiple sites for hydride transport from the interior of the fuel rod, thus preventing the formation of hydride blisters.

Preferably the thin film is nickel metal having a thickness of about 0.01 to 2.5 microns.

DESCRIPTION OF THE PREFERRED EMBODIMENT

The nuclear fuel rod of the present invention comprises a zirconium-based metallic tubular cladding which contains a solid nuclear fuel, in the form of pellets hermetically sealed therein, with a nickel, or a nickel base-zirconium alloy, film disposed over a portion of the inner surface of the cladding.

Figure 1:
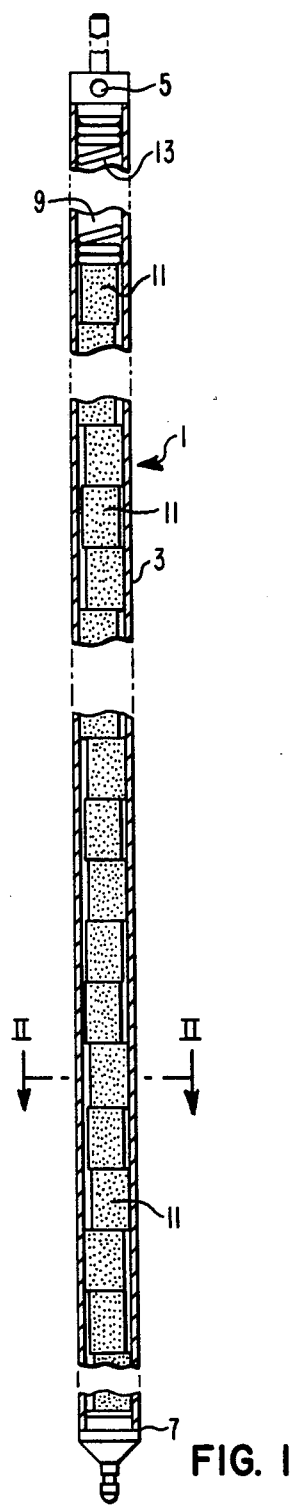
FIG. 1 is a longitudinal sectional view of a fuel rod, containing a plurality of uranium dioxide pellets in accordance with the present invention.

As illustrated in FIG. 1, a fuel rod 1 for use in a nuclear reactor fuel assembly comprises an elongated zirconium-based metallic tubular cladding 3 having a top end plug 5 and a bottom end plug 7 that forms a closed chamber 9. Pressed and sintered nuclear fuel pellets 11 are placed into the chamber 9 and are biased against the bottom end plug 7 by means of a spring 13 or other biasing means. The nuclear fuel pellets 11 are initially of a diameter slightly less than the interior diameter of the zirconium-based metallic cladding 3 resulting in a clearance space. This clearance space 15 is shown in FIG. 2, which is an enlarged transverse cross section of the fuel element in FIG. 1 viewed along arrows II—II.

Figure 2:
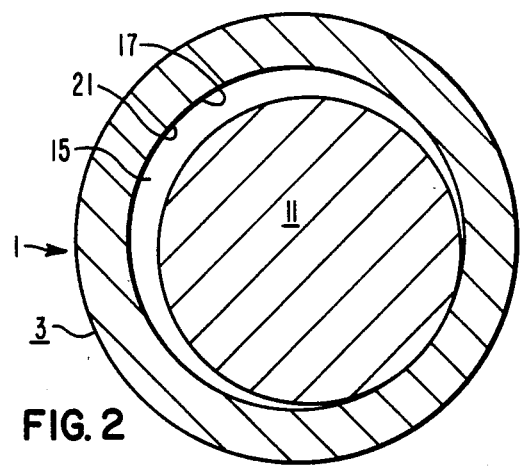
FIG. 2 is an enlarged transverse cross-sectional view of the fuel rod shown in FIG. 1 taken along section II—II.

As shown in FIG. 2, no attempt is made to control the radial position of the fuel pellet 11, and in fact individual pellets 11 are in point or line contact with the inner surface 21 of the cladding 3. Also, during use, the clearance space 15 will diminish in size due to creep of the cladding material and swelling of the fuel pellets 11, and the clearance space 15 will tend to disappear in most or substantially all of the interior regions of the fuel rod 1. The chamber 9 is normally filled with a helium atmosphere, while a protective zirconium oxide film 17, which may be intentionally formed or results from oxygen-containing components in the fuel rod, is present over the interior surface 21 of the cladding 3.

Figure 3:
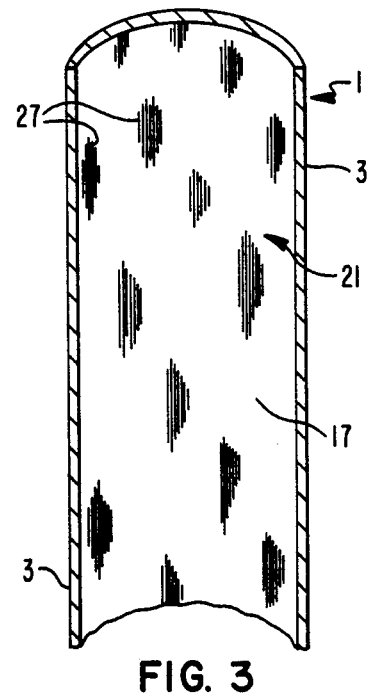
FIG. 3 is an enlarged view of a portion of the fuel rod shown in FIG. 1, with the fuel removed to expose the intermittent, and substantially uniformly distributed, nickel film.

In accordance with the preferred embodiment of the present invention, the zirconium-based metallic tubular cladding has a thin film of nickel metal on a portion of the inner surface of the metallic cladding to provide multiple sites for hydride transport to the cladding. As illustrated in FIG. 3, the nuclear fuel rod 1 comprising the zirconium-based metallic cladding 3, in which there are contained the fuel pellets, has a thin film of nickel metal 27 over a portion of the inner surface 21, preferably breaking or displacing as much as possible in those areas, the zirconium oxide film 17 on the cladding 3. In order to better show the nickel film 27, the nuclear fuel pellets have been removed in the drawing.

The nickel film 27 is intermittently disposed over only about 1–40 percent of the area of the internal surface 21 of the metallic cladding 3, in order to provide sites for hydride transport to the cladding 3, and is preferably disposed over about 10–20 percent of the area of the internal surface 21. The presence of the nickel film over less than about one percent of said interior surface would not provide sufficient sites for hydride transport along the length of the cladding, while use of nickel film over more than about 40 percent of said interior surface, in addition to wasting the nickel, would tend to unnecessarily absorb neutrons and decrease the efficiency of the energy output from the rod.

The term nickel "film" is used herein to describe the deposition of the nickel over the interior surface since the thickness of the nickel disposition is very small. The thickness of the nickel film on the interior surface is between 0.01 and 5 microns and preferably between 0.01 to 2.5 microns. Use of a film of less than 0.01 micron in thickness would not provide enough nickel to effect sufficient hydride transfer. A thickness of greater than about 5 microns, in addition to being economically inefficient, would unnecessarily provide excess nickel for the absorption of neutrons from the fuel and thus reduce the efficiency of the nuclear fuel rod.

The nickel film may be formed by shot peening the interior surface of the cladding with nickel or nickel coated shot, by passing a soft ball of nickel having a diameter about the size of the interior diameter of the cladding through the tubular cladding, or by other methods which would impart a thin film of nickel on the interior surface of the cladding while preferably breaking or displacing the zirconium oxide film at those regions where the film is formed. A zirconium-nickel base alloy film may be similarly formed using a zirconium-nickel base alloy shot, for example.

In order to assure hydride transport to the cladding, the thin film of nickel 27 should break or displace the zirconium oxide film 17 present, and should be dispersed over the interior surface 21 as uniformly as is practically achievable. While complete uniformity may not be achievable, along the length of the interior surface of the cladding, the nickel film should be so distributed as to cover a substantially uniform area fraction along the interior surface so as to provide sufficient sites for hydride transport regardless of the source of the hydrogen from within the fuel rod.

The metallic cladding used in the present nuclear fuel rod is a zirconium-based alloy, such as Zircaloy-2 or Zircaloy-4. In addition, a layer of zirconium may be bonded in a substantially uniform layer on the inside surface of the zirconium alloy to form a composite cladding. The fuel pellets, as is conventional, may comprise uranium dioxide or a mixed uranium-plutonium dioxide. In situations where it is desired, the fuel rod may also contain a burnable poison such as boron, which burnable poison may be mixed with the nuclear fuel pellets or coated thereon.

In addition to preventing hydride blistering on the zirconium-based cladding, the nickel film may also be useful for formation of a low cost getter at the top section of a fuel rod.

What is claimed is:

1. A nuclear fuel rod comprising:
   a metallic tubular cladding formed from a zirconium alloy, containing a nuclear fuel therein, and having end sealing means thereon to hermetically seal said nuclear fuel within said metallic tubular cladding;
   a discontinuous thin film, about 0.01 to about 5 microns thick, of material, selected from the group consisting of nickel metal and nickel base-zirconium alloys, on the internal surface of said metallic tubular cladding to provide a nickel metal film over 1–40 percent of the area of said internal surface; and
   whereby multiple sites of said thin film are provided for hydride transport from the interior of the nuclear fuel rod, so as to prevent localized hydride transport and resulting hydride blistering, and cladding failures resulting therefrom.

2. The nuclear fuel rod as defined in claim 1, wherein said thin film is nickel metal, and is of a thickness of between 0.01 to 2.5 microns.

3. The nuclear fuel rod as defined in claim 2, wherein said thin film is disposed over about 10–20 percent of the area of said internal surface.

4. The nuclear fuel rod as defined in claim 1, wherein said thin film is a nickel metal film and is distributed substantially uniformly along the length of the interior surface of said fuel rod.

5. The nuclear fuel rod as defined in claim 1, wherein said nuclear fuel is selected from the group consisting of uranium dioxide and a mixture thereof with plutonium dioxide.

6. The nuclear fuel rod as defined in claim 1, wherein said zirconium alloy comprises Zircaloy-2.

7. The nuclear fuel rod as defined in claim 1, wherein said zirconium alloy comprises Zircaloy-4.

8. A nuclear fuel rod comprising:
   a metallic tubular cladding formed from a zirconium alloy, containing a nuclear fuel, and having end sealing means thereon to hermetically seal said nuclear fuel within said metallic tubular cladding;

a discontinuous thin film of material selected from the group consisting of nickel metal and nickel base-zirconium alloys having a thickness of between 0.1 to 5 microns, on the internal surface of said metallic tubular cladding to provide said thin film distributed substantially uniformly over 1–40 percent of the interior surface of said cladding; and whereby multiple sites of said thin film are provided for hydride transport from the interior of the nuclear fuel rod, so as to prevent localized hydride transport and prevent hydride blistering, and cladding failures resulting therefrom.

9. A hydride blister-resistant zirconium-based nuclear fuel rod cladding comprising:

a metallic tubular cladding formed from a material comprising a zirconium base material having an interior arcuate surface;

a discontinuous thin film of material selected from the group consisting of nickel metal and nickel base-zirconium alloys on said interior arcuate surface; and said thin film being distributed over 1–40 percent of the area of said interior surface.

10. The hydride blister-resistant zirconium-based nuclear fuel rod cladding as defined in claim 9 wherein said thin film is nickel metal and has a thickness of between 0.01 to 2.5 microns.

11. The hydride blister-resistant zirconium-based nuclear fuel rod cladding as defined in claim 10 wherein said nickel metal film is disposed over about 10–20 percent of the area of said interior arcuate surface.

12. The hydride blister-resistant zirconium-based nuclear fuel rod cladding as defined in claim 9 wherein said think film is distributed substantially uniformly along the length of said interior arcuate surface.

13. The hydride blister-resistant zirconium-based nuclear fuel rod cladding as defined in claim 9 wherein said zirconium base material comprises Zircaloy-2.

14. The hydride blister-resistant zirconium-based nuclear fuel rod cladding as defined in claim 9 wherein said zirconium base material comprises Zircaloy-4.

15. A process for producing a zirconium base material nuclear fuel rod cladding tube which is resistant to hydride blister formation during nuclear reactor use, said process comprising the step of:

depositing a discontinuous film of a material selected from the group of nickel and zirconium-nickel base alloys in a substantially uniform, but intermittent manner, on the interior surface of said zirconium base material cladding tube.

16. The process according to claim 15 wherein said depositing step is performed by shot peening said interior surface with nickel shot.

17. The process according to claim 15 wherein said depositing step is performed by shot peening said interior surface with nickel coated shot.

* * * * *